United States Patent [19]

Spiegelberg et al.

[11] Patent Number: 5,425,170
[45] Date of Patent: Jun. 20, 1995

[54] SIDE WALL ELECTRICAL BATTERY TERMINAL

[75] Inventors: Bernard N. Spiegelberg, Germantown; Mark E. Sauter, Shorewood, both of Wis.

[73] Assignee: Tulip Corporation, Milwaukee, Wis.

[21] Appl. No.: 199,100

[22] Filed: Feb. 22, 1994

Related U.S. Application Data

[62] Division of Ser. No. 79,153, Jun. 17, 1993.

[51] Int. Cl.6 ............... H01R 43/16; B23P 19/00
[52] U.S. Cl. ............................. 29/874; 29/730; 72/357; 72/358; 429/178
[58] Field of Search ............ 72/352, 353, 357, 358; 29/432.1, 432.2, 33 M, 747, 729, 730, 522.1, 874; 429/178

[56] References Cited

U.S. PATENT DOCUMENTS

| | | | |
|---|---|---|---|
| 3,381,515 | 5/1968 | Orloff | 72/357 X |
| 4,424,854 | 1/1984 | Tiegel. | |
| 5,296,317 | 3/1994 | Ratte et al. . | |
| 5,349,840 | 9/1994 | Ratte et al. | 72/357 X |

*Primary Examiner*—Carl J. Arbes
*Attorney, Agent, or Firm*—Foley & Lardner

[57] ABSTRACT

A cold formed side wall terminal for a storage battery, the terminal being formed from a lead slug having a cavity at one end, a stainless steel nut positioned in the cavity and encapsulated therein on cold working the lead slug, the terminal further including a spline ring at the other end and a number of seal rings formed on the outside of the terminal intermediate the ends thereof.

6 Claims, 8 Drawing Sheets

SIDE WALL ELECTRICAL BATTERY TERMINAL

This is a divisional of U.S. Ser. No. 08/079,153 filed on Jun. 17, 1993, entitled "Side Wall Electrical Battery Terminal."

FIELD OF THE INVENTION

This invention relates to electrical battery terminals and more particularly to a cold formed side wall battery terminal having a stainless steel nut embedded therein.

BACKGROUND OF THE INVENTION

Battery terminals for automobiles and the like are generally mounted on the top of the battery. The battery poles are embedded in the battery cover during the manufacturing process by molding the cover material around the base of the terminal. Battery acid over time seeps out of the battery through the seal between the cover and the battery terminal. As the acid accumulates on the cover between the terminals the acid creates a short across the terminals which gradually reduces the life of the battery. The seal around the terminal may also be broken if the terminal is inadvertently hit or struck during handling which also allows acid to escape.

Terminals of this type are manufactured by cold casting a lead blank having an inner cavity by a process and apparatus as shown in U.S. Pat. No. 4,776,197, entitled "Process And Apparatus For Producing An Electrical Battery Pole Or Terminal," issued on Oct. 11, 1988, to Giorgio Scott. In this process an essentially cylindrical lead blank is placed between a first and a second die. When the dies are closed the blank is forced into a cavity provided in the first or upper die. The second die includes a truncated cone which is forced into the blank forming a cavity in the terminal. A number of ribs are provided on lower end of the terminal which are embedded in the battery cover to form a seal. The terminal is removed from the die and completed by process milling off the ends of the terminal in order to finish the battery terminal.

Die cast terminals are also used on batteries both on top and on the sides of the battery. However, die cast terminals are porous and subject to expansion on heating which may blow out the terminal when the electric contacts are welded to the terminal.

SUMMARY OF THE PRESENT INVENTION

The present invention is concerned with a side wall battery terminal which is designed to be completely embedded in one of the sides of the battery casing. The terminal is formed from a lead blank having a stainless steel nut positioned in a cavity at one end of the blank. The blank is positioned between a pair of dies which are closed to cold form the terminal and to permanently embed the stainless steel nut within the terminal. The terminal, when completed, is then embedded in the side wall of the battery with the inner surface either coplanar with the inner surface of the battery wall or recessed in the wall. The outer end of the terminal is embedded in a protective ring formed on the surface of the outer wall. The electric battery terminals formed by this process do not have any protruding parts and are therefore free of any possible damage in storage or use.

Another advantage of the terminal according to the present invention is the ability to quickly and easily connect the inner surface to the electrical system within the battery during assembly. The threaded nut also provides a quick and easy means for attaching the battery cables to the battery.

By locating the terminal in the side wall of the battery the possibility of shorting the terminals due to leakage is eliminated, thus prolonging the life of the battery.

Other principal features and advantages of the invention will become apparent to those skilled in the art upon review of the following drawings, the detailed description and the appended claims.

Figures 1, 1A:
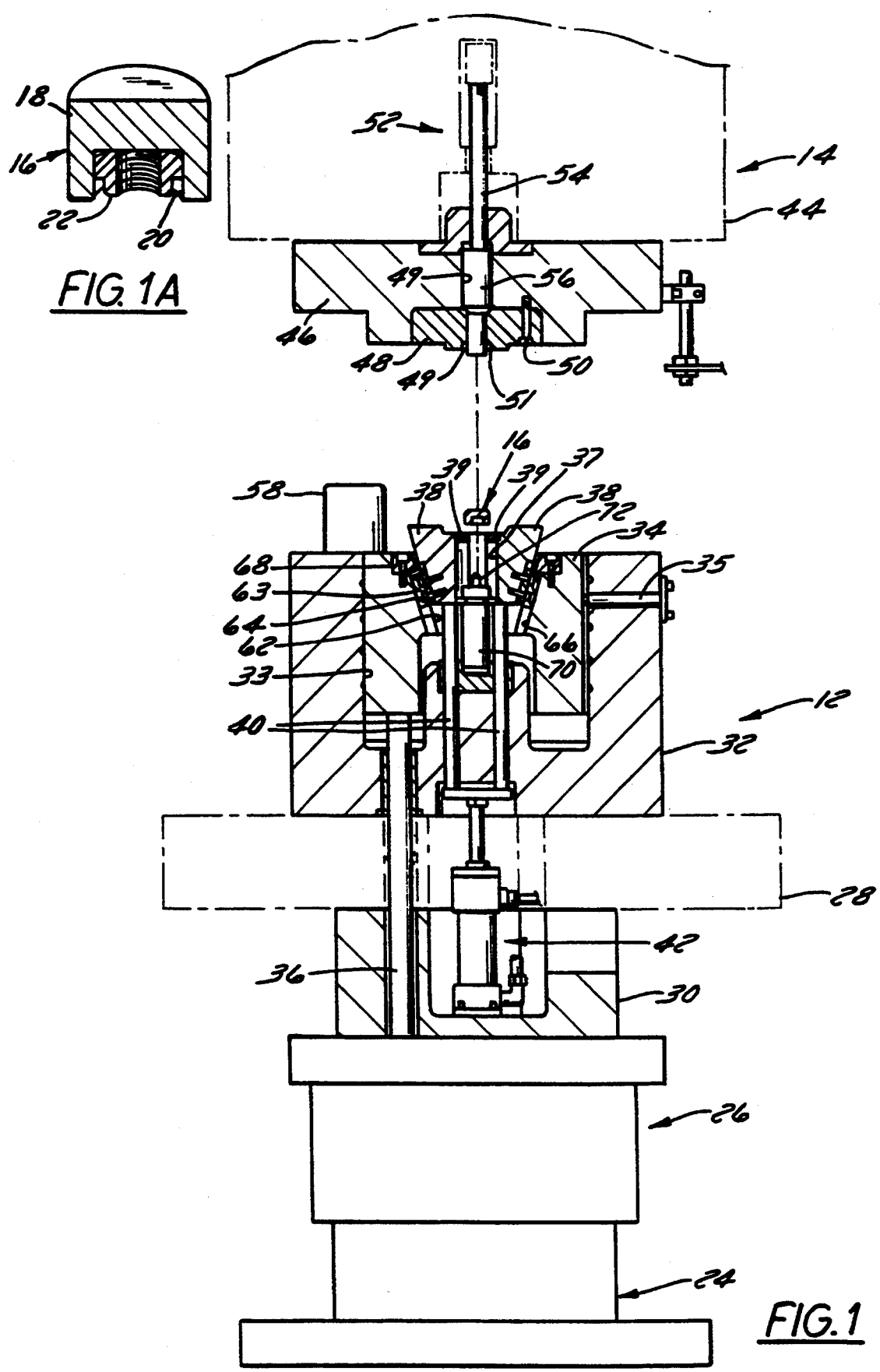
FIG. 1 is a schematic view of the die assembly in the open position.
FIG. 1A is a cross-sectional perspective view of the lead slug and stainless steel nut.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figures 7, 8, 9:
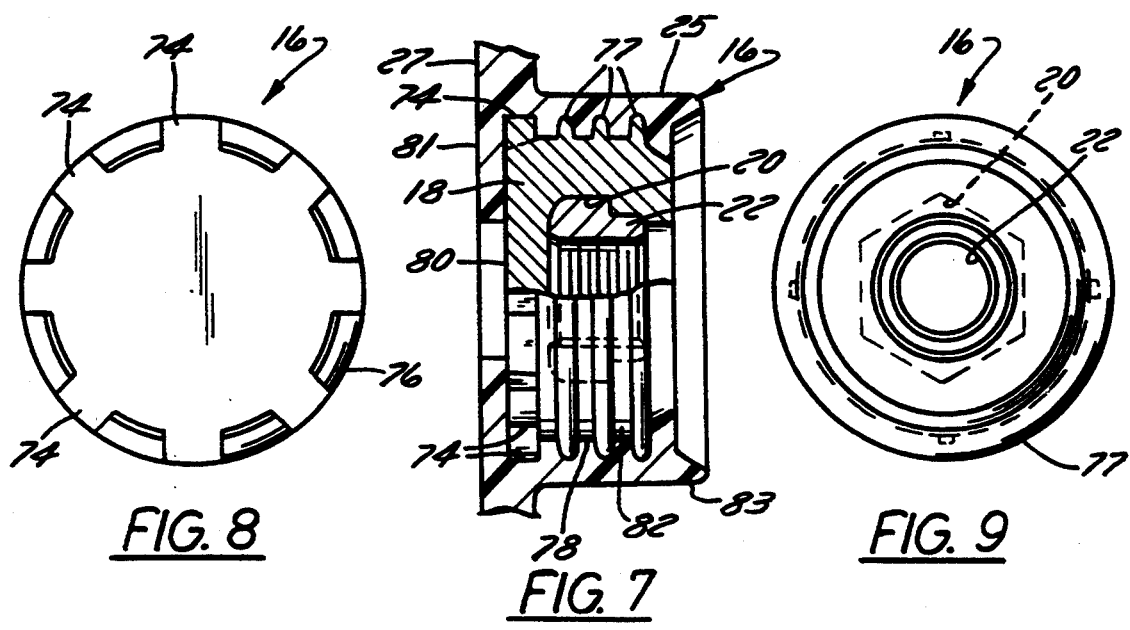
FIG. 7 is a side view of the battery terminal shown mounted in the battery side wall and partly broken away to show the position of the terminal in the side wall.
FIG. 8 is a view of the inner surface of the terminal.
FIG. 9 is a view of the outer end of the terminal.

The side wall battery terminal 16 according to the present invention is shown in FIGS. 7, 8 and 9. The terminal is formed by cold working a lead slug 18 to encapsulate a stainless steel nut 22 in a cavity 20 in slug 18. A number of seal rings 76 and a spline ring 74 are formed around the outside of the slug 18. An inner electrical contact surface 80 is provided on the inner end of the slug 18. The stainless steel nut 22 includes a threaded aperture for connection to the battery cables. The terminal 16 is molded into the side wall 25 of a battery casing 27 as shown in FIG. 7 with the inner surface 80 flush or recessed with respect to the inner surface 81 of the battery casing. The outer end 82 of the terminal is enclosed within a protective ring 83 formed on the surface of the side wall to prevent contact with battery terminals on adjacent battery casings.

The terminal 16 is formed by a die assembly 10 which generally includes a lower die 12 and an upper die 14. The terminal is formed from a lead slug 18 as shown in FIG. 1A which includes a cavity 20 at one end. A stainless steel nut 22 is positioned in the cavity 20 and retained therein by an interference fit. The lead slug and nut are positioned in the lower die 12 and the upper die 14 closed on the lower die to cold form the battery terminal.

Referring to FIG. 1 the lower die 12 generally includes a base 24 for supporting a cushion assembly 26. A bolster 28 is supported on the cushion assembly 26 by a block 30 to support a housing 32 having a cylindrical opening 33. A cushion ring 34 is aligned in the opening 33 in housing 32 and retained therein by means of pins 35. A number of rods 36 are supported on the cushion 26 in a position to engage the cushion ring 34. The cushion ring 26 includes a conical opening 37 for supporting a cone shaped split die 38 which is seated in the conical opening in the cushion ring 34. A cylindrical opening 33 is formed by the split die 38. A pair of rods 40 are positioned beneath the split die 38 and are supported on an ejector assembly 42 in block 30. Each half of the split die 38 includes a number of grooves 39 around the opening 33 in upper edge of each half of the split die as shown in FIG. 5A.

The upper die 14 includes a press ram 44 having a die plate 46 mounted on the bottom of the ram 44. A die 48 is mounted on the die plate by screws 50. The die 48 includes a recess 49 on the bottom having a plurality of indents 51 around the perimeter thereof to form a spline ring 74 on the terminal as described hereinafter. A knockout bar assembly 52 is supported by the press ram 44 in alignment with the die 48. The knockout assembly includes a rod 54 and a knockout bar 56 mounted on the end of the rod 54. The end of the knock out bar 56 is centered in the top of recess 49 to form the inner end of the terminal and to release the terminal from the recess. A number of cylindrical guide blocks 58 are provided on the upper end of the housing 32 which are aligned with openings 60 in the die plate 46 for aligning the upper and lower dies during operation.

Figure 2:
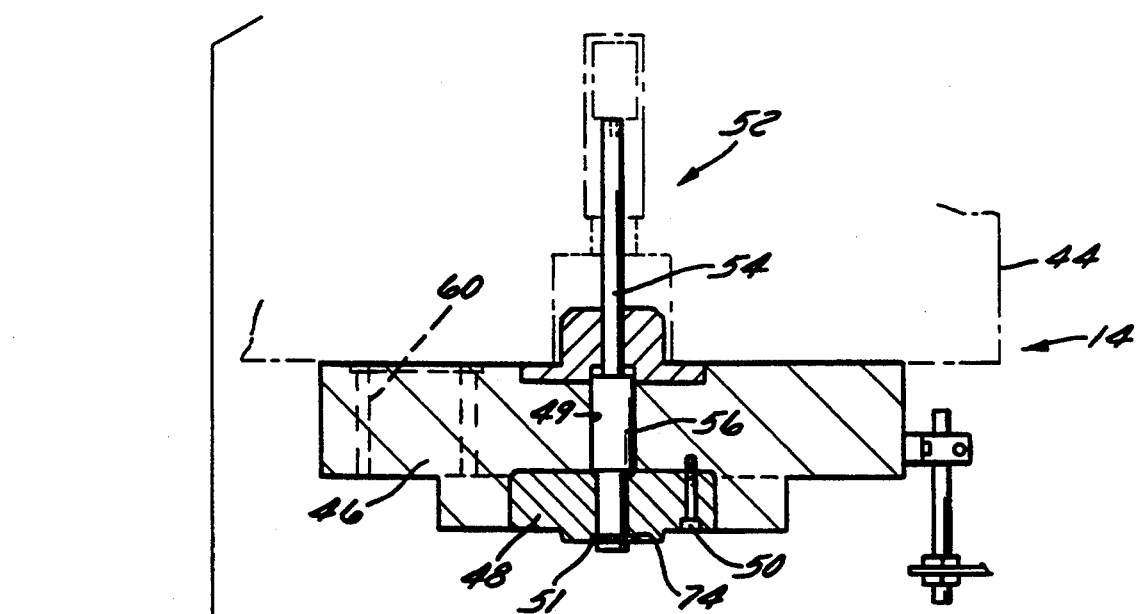
FIG. 2 is a cross-sectional view of the die assembly showing the lead slug positioned in the split die.
Figure 2:
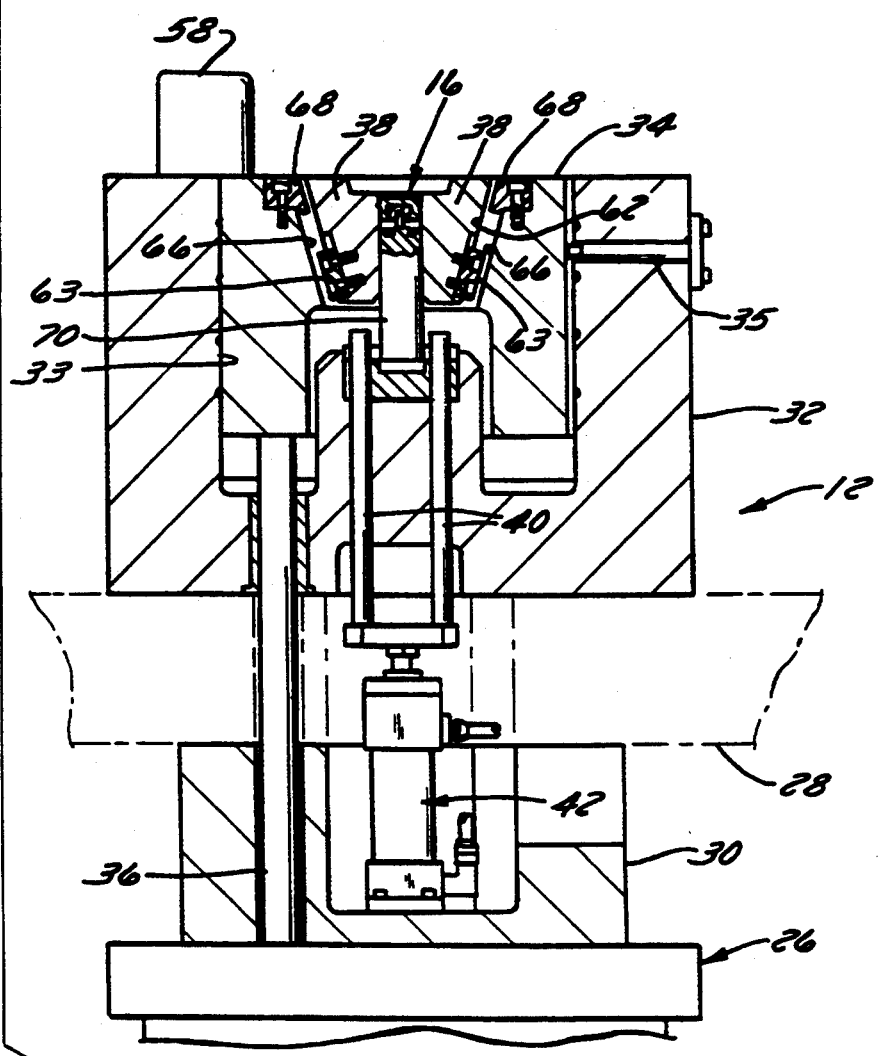
Figure 2A:
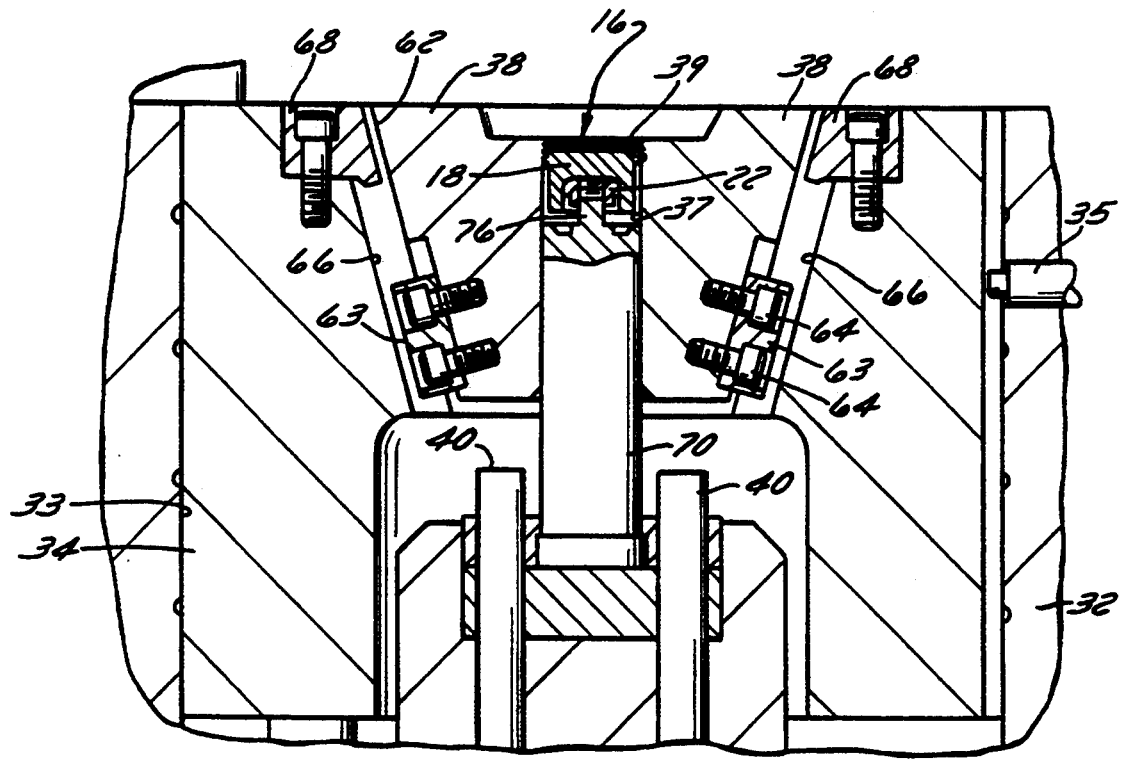
FIG. 2A is an enlarged view of the split die showing the lead slug in the die.

Referring to FIGS. 2 and 2A the lower die 12 is shown with the cushion ring 34 in the upper position and the split die 38 seated in the conical opening 62 in the cushion ring. The split die 38 includes a number of guide blocks 63 secured to the split dies 38 by screws 64. The blocks 63 are aligned in dovetail grooves 66 provided in the conical opening 62. Limit stop assemblies 68 are provided on the upper end of the grooves 66 to limit the travel of the split die 38. A terminal slug 18 is shown supported on the pin 76 on the upper end of punch 70 in the opening 33 between the split die assembly 38.

Figure 3A:
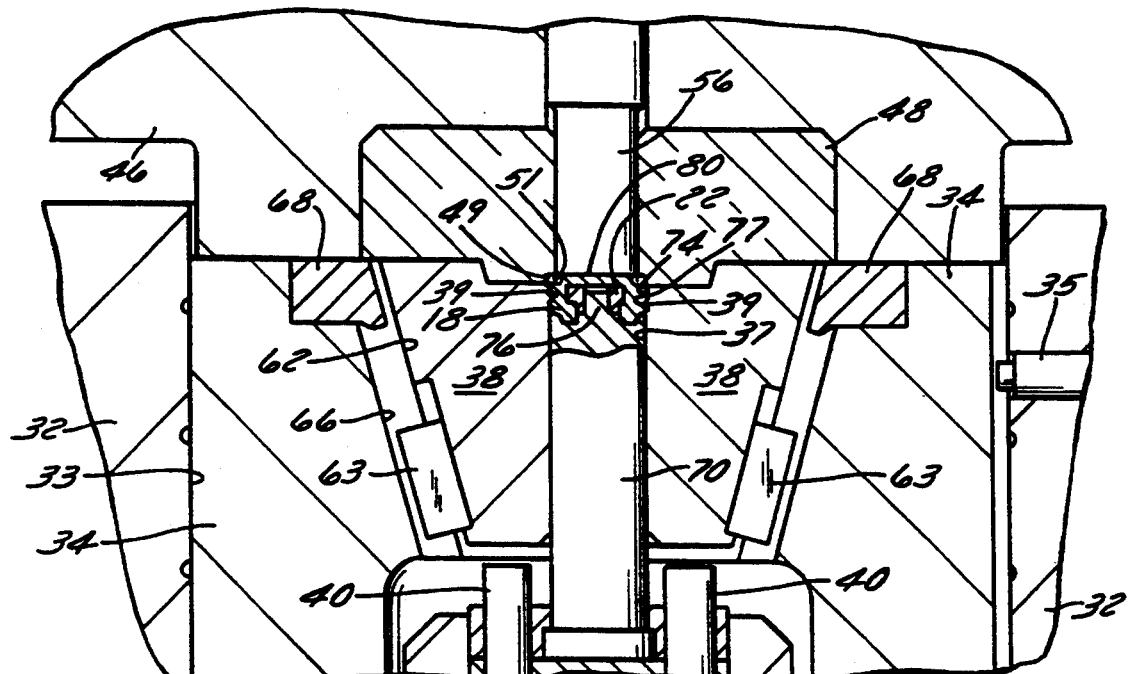
FIG. 3A is an enlarged view of the die assembly showing a cross-section of the lead slug formed around the stainless steel nut.
Figure 3:
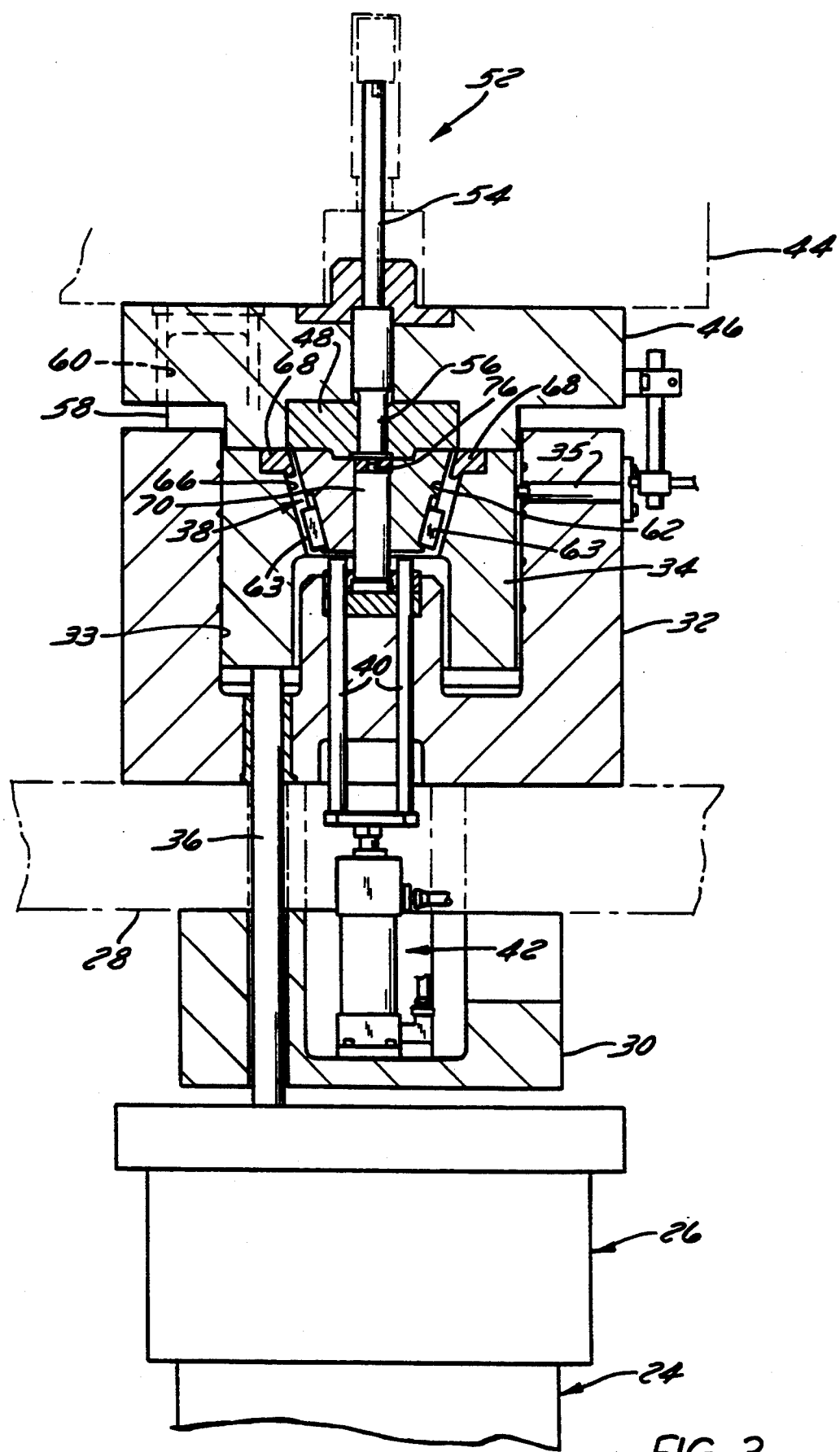
FIG. 3 is a cross-sectional view of the die assembly showing the press ram in the closed position.

Referring to FIGS. 3 and 3A the press ram 44 is shown in the down or operative position with the split die assembly 38 seated in the conical opening 62 in the cushion ring. As the split die assembly 38 is forced down by the upper die the terminal assembly will form in the opening 33. It should be noted that the split die assembly 38 is wedged into the conical opening 62 in the cushing ring 34. Once the die assembly 38 is seated in the cushion ring 34 as shown in FIG. 2, the face of plate 48 bears against the surface of the split die assembly 38. The cushion 26 resists the downward motion of the split die 38 with sufficient force to maintain a seal between the plate 48 and the die 38 while the lead slug is squeezed between the stationary punch 70 and the knock out bar 56 to form the terminal assembly.

In FIG. 3A the lead slug is shown formed into the terminal with the stainless steel nut 22 captured in the cavity. The rings 77 are formed in the grooves 78 in the split die. The spline ring 74 is formed in the recess 49 in die plate 48. The face 80 of the terminal abuts the end of the knockout bar 56.

Figure 4:
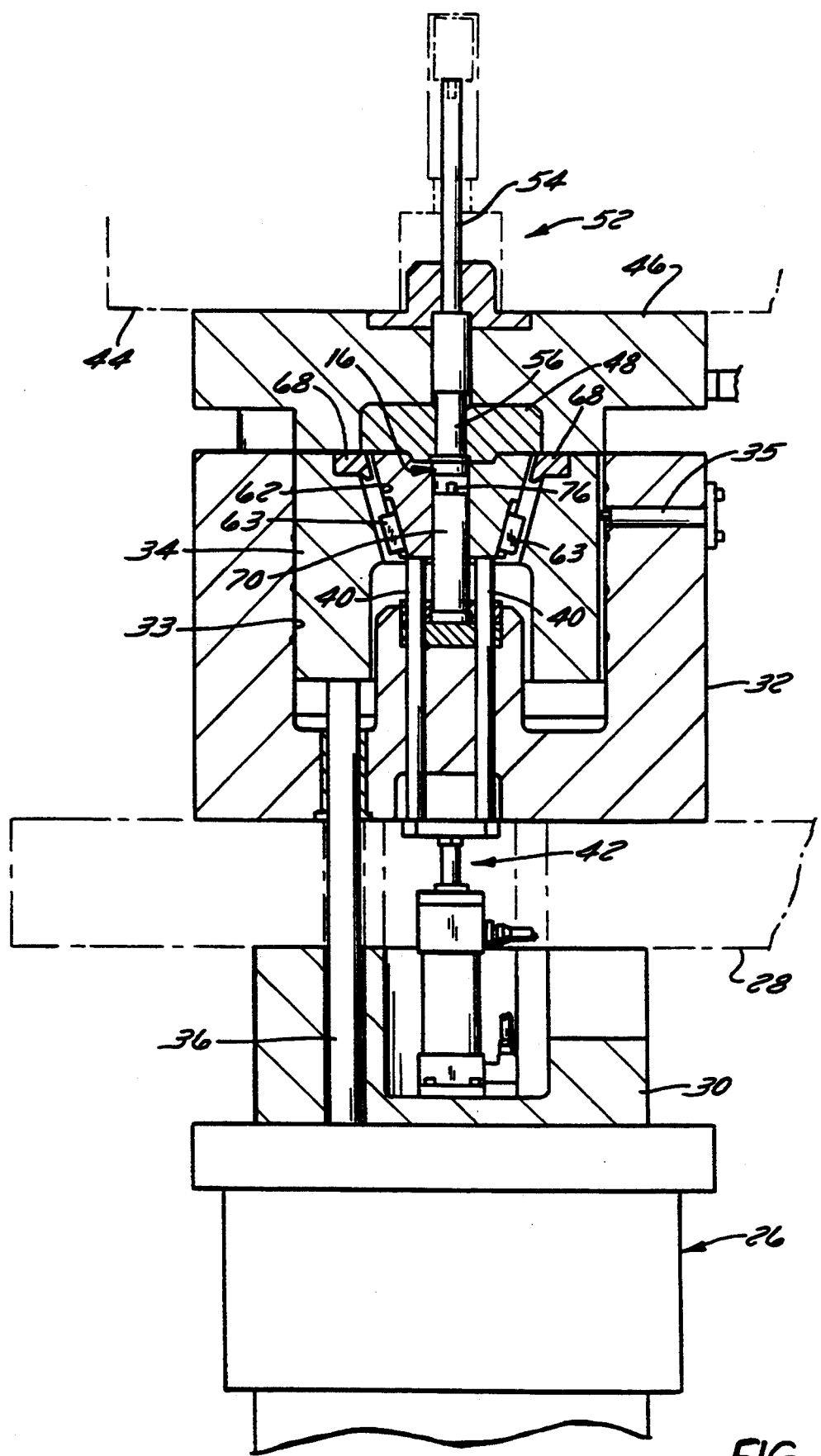
FIG. 4 is a cross-sectional view of the die assembly showing the position of the punch when the die is raised to strip the terminal from the punch.
Figure 4A:
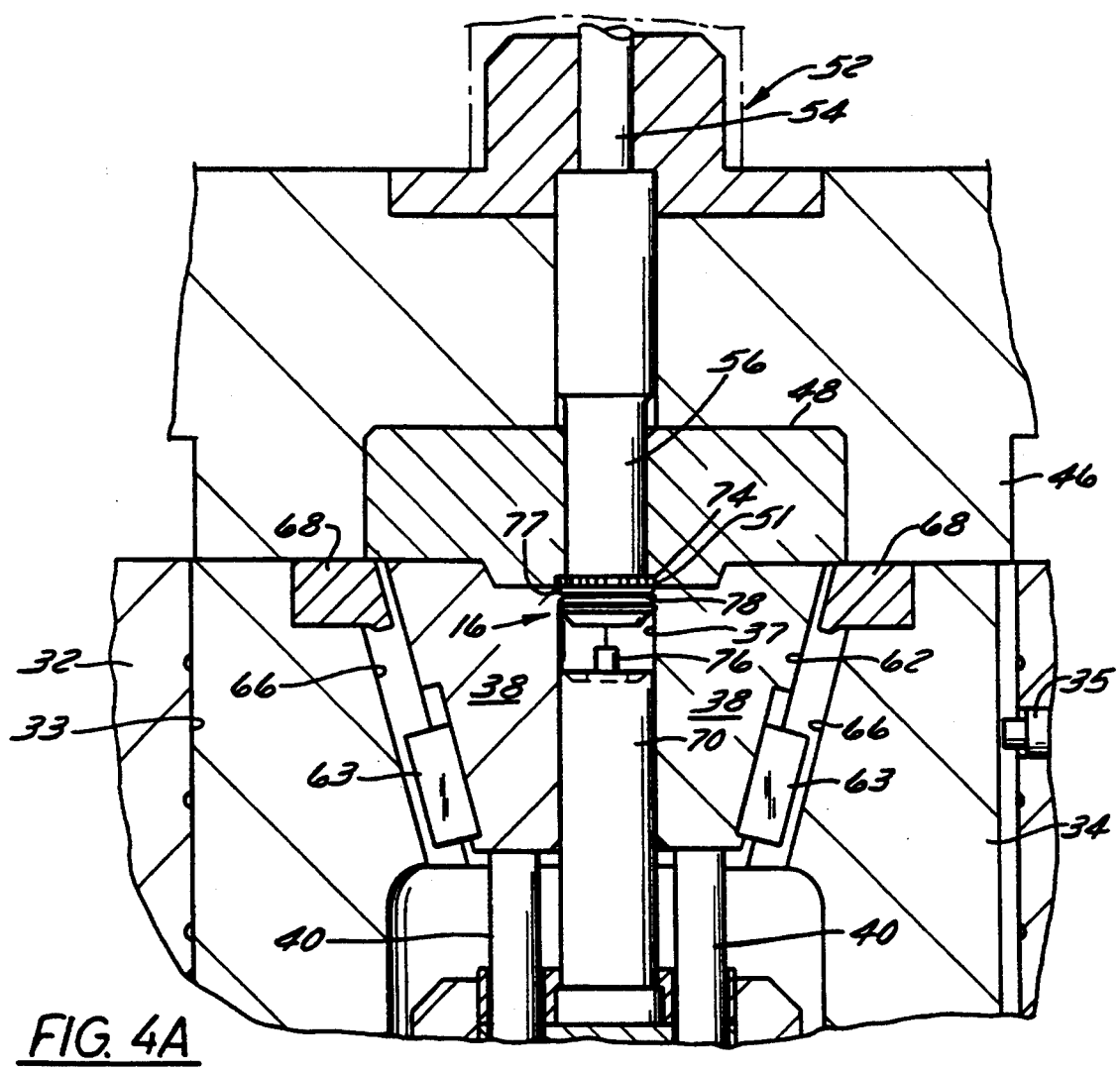
FIG. 4A is an enlarged view of a portion of FIG. 4 showing the terminal supported by the split die.

In FIGS. 4 and 4A the terminal assembly 16 is shown locked in the split die 38 with the spline ring 74 formed in the recess 49 in die plate 48. The press ram 44 is retracted far enough to clear the guide pin 76 on punch 70 from the terminal assembly.

Figure 5:
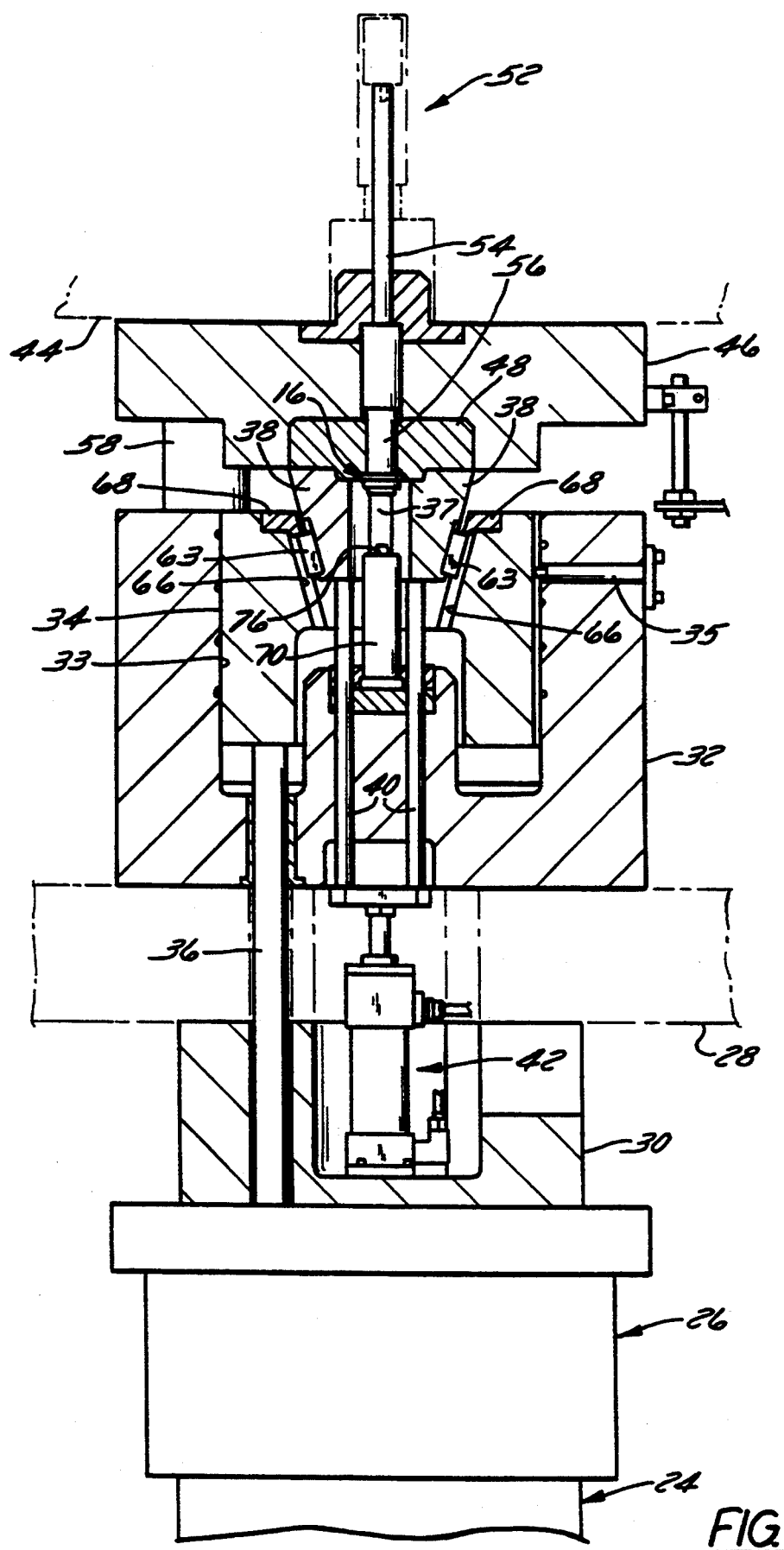
FIG. 5 is a cross-sectional view of the die showing the split die in the open position to release the terminal.
Figure 5A:
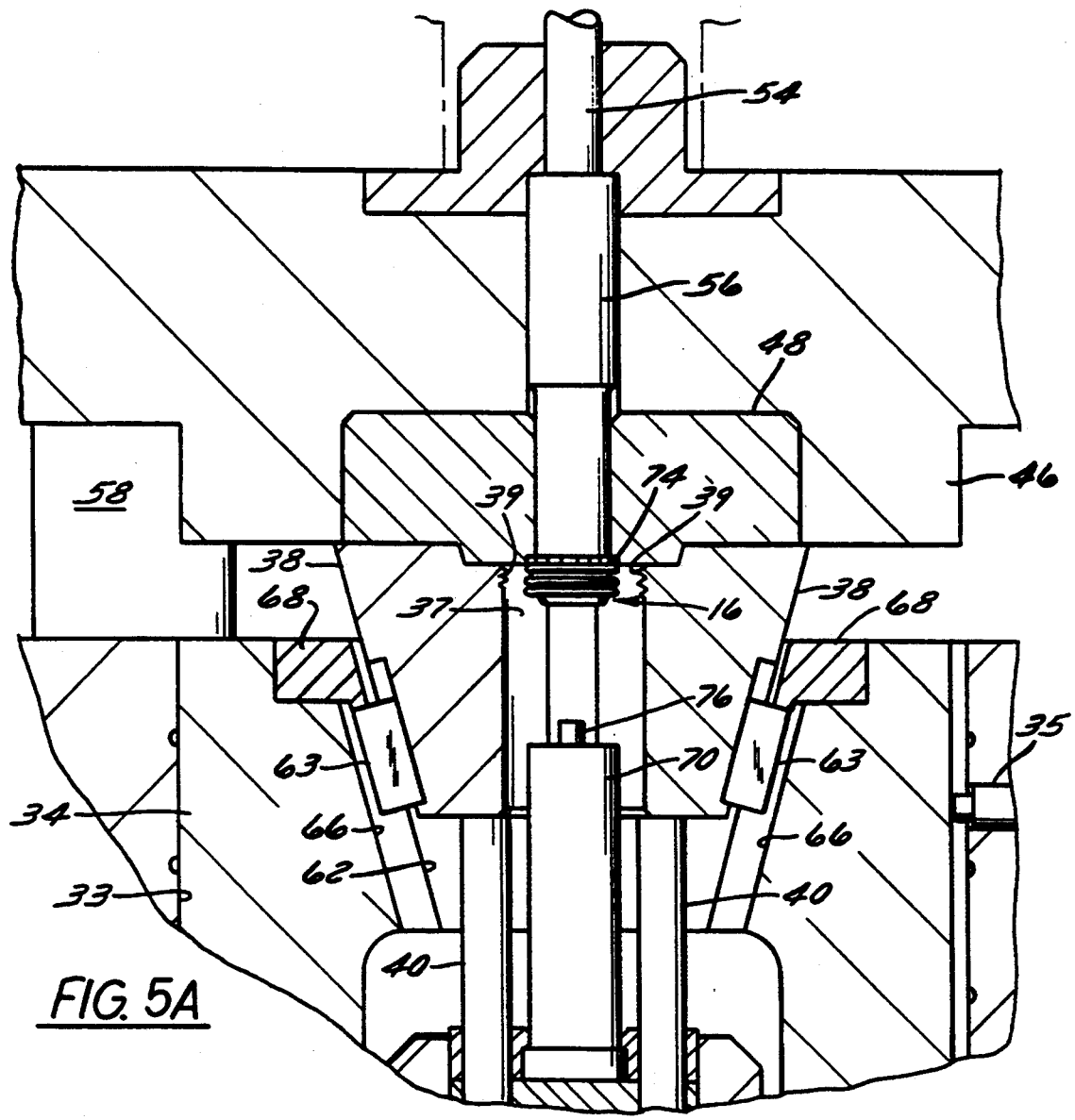
FIG. 5A is an enlarged view of a portion of the die assembly shown in FIG. 5.

Referring to FIGS. 5 and 5A the split die 38 is shown moved upward by pins 40 simultaneously with the upward movement of the press ram 44 allowing the split die 38 to open outwardly from the terminal assembly 16. The spline ring 74 remains seated in the recess in the die plate 48.

Figure 6:
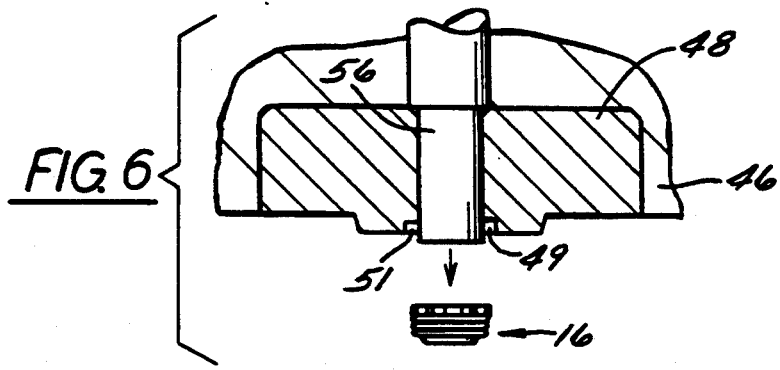
FIG. 6 is a partial view of the upper die showing the knock out bar in the down position to release the terminal from the upper die.

In FIG. 6 the upper die is shown raised to the upper position. The guide blocks 63 follow the path of dovetail slots 66 to split the die assembly 38 away from the terminal assembly 16. The terminal assembly 16 is released from the die plate 48 by actuating the knockout bar 56 to knock the terminal assembly 16 out of the recess 49 in die plate 48. The terminal is then blown away from the upper die to clear the space for the next slug.

Referring to FIGS. 7, 8 and 9 the terminal assembly 16 is shown in its finalized state. A series of rings 78 are provided around the outer periphery of the terminal assembly with the stainless steel nut 22 captured in the cavity 20. The terminal is shown in the battery casing wall in FIG. 7 with the flat inner surface 80 in alignment with the inside of the wall and the other end of the terminal aligned with the outside of the wall.

Thus, it should be apparent that there has been provided in accordance with the present invention a side wall electrical battery terminal that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method for cold forming a side wall battery terminal having a stainless steel nut embedded therein comprising the steps of:
   forming a lead slug with an opening at one end,
   placing a stainless steel nut in the opening in the lead slug,
   positioning the stainless steel nut in the lead slug on a pin at the upper end of a punch,
   moving a split die ring into engagement with the punch to form a cavity around the lead slug,
   moving a press ram downward into engagement with the die ring to form a seal between the press ram and the die ring, and moving a knock out bar into engagement with the lead slug with sufficient force to cold form the slug to the shape of the cavity in the die ring.

2. The method according to claim 1 including the step of providing a number of grooves in said die ring to form a corresponding number of seal rings around the periphery of the terminal.

3. The method according to claim 2 including the step of providing a number of indents in the bottom of the die plate to form a spline ring around the perimeter of the terminal.

4. A method for cold forming a steel nut into a cavity in a lead slug to form a side wall battery terminal comprising the steps of:
   positioning the lead slug on a pin,
   enclosing the lead slug in a cavity formed by a split die ring,
   moving a knock out bar into engagement with the die ring to cold form the lead slug to the shape of the cavity in the die ring with the steel nut embedded in the terminal.

5. The method according to claims 4 including the step of forming a number of grooves in the die ring to form a corresponding number of seal rings around the periphery of the terminal.

6. An apparatus for cold forming a side wall battery terminal from a lead slug having a cavity at one end and a stainless steel nut positioned within the cavity, said apparatus comprising a first stationary die having a punch mounted on said die,
   a second die mounted for movement toward and away from said stationary die, said second die including a cavity for forming a spline ring at the inner end of the terminal,
   a split die mounted in said stationary die for movement into engagement with said second die, said split die including a number of peripheral recesses for forming seal rings around the outer perimeter of said terminal and a punch in said first die having a core pin for supporting the slug in the end of said punch.

* * * * *